(12) United States Patent
Brush et al.

(10) Patent No.: US 6,396,917 B1
(45) Date of Patent: May 28, 2002

(54) SUBSCRIBER ANNOUNCEMENT SYSTEM

(75) Inventors: Wesley A. Brush, Brick; Jennifer H. Chen; Edite M. Hanlon, both of Freehold; Gary A. Munson, Little Silver, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/326,356

(22) Filed: Jun. 4, 1999

(51) Int. Cl.$^7$ .......................... H04M 1/64; H04M 7/00; H04M 1/24

(52) U.S. Cl. ............................ 379/201.12; 379/67.1; 379/76; 379/88.22; 379/221.11; 379/15.03

(58) Field of Search .......................... 379/67.1, 88.04, 379/88.17, 88.18, 88.22, 88.23, 88.25, 88.27, 201.01–201.03, 201.12, 72, 76, 88.13, 93.12, 221.08, 221.11, 266.07, 214.01, 15.02, 15.03

(56) References Cited

U.S. PATENT DOCUMENTS

| | | | | |
|---|---|---|---|---|
| 5,583,920 A | * | 12/1996 | Wheeler, Jr. ................. | 379/88 |
| 5,712,903 A | * | 1/1998 | Bartholomew et al. .. | 379/88.25 |
| 6,014,437 A | * | 1/2000 | Acker et al. ................ | 379/219 |
| 6,075,854 A | * | 6/2000 | Copley et al. .............. | 379/211 |

* cited by examiner

Primary Examiner—Allan Hoosain

(57) ABSTRACT

A communications network includes plural intelligent peripherals, a single announcement management system, a service provisioning platform and plural service control points controlled by corresponding application programs. A method of provisioning a service in the network includes recording an announcement at an intelligent peripheral, receiving an ID number associated with the announcement from the announcement management system at the intelligent peripheral, sending the ID number from the intelligent peripheral through a switch to a service control point, distributing the ID number from the service control point to all other service control points, and distributing the announcement and the ID number from the intelligent peripheral to all other intelligent peripherals.

8 Claims, 3 Drawing Sheets

SUBSCRIBER ANNOUNCEMENT SYSTEM

BACKGROUND OF THE INVENTION

1. Field of the Invention

The present invention relates to voice announcements used within communications networks. In particular, the invention relates to a procedure to permit subscribers to record on the fly such announcements for use throughout the network.

2. Description Of Related Art

Known telephone networks provide subscribers with various services, some of which include voice announcements. For example, in many areas of the United States, a subscriber may call for directory assistance and be connected to a computer platform that prompts (i.e., asks) "what city" and then prompts "what listing". These prompts are announcements (i.e., voice files) that are pre-recorded, often by professionals. The pre-recorded announcement voice files are pre-installed at locations throughout the telephone network when the associated service is provisioned.

In FIG. 3, known telephone network 1 includes a service switching point 4 (called SSP or simply, switch) connected between network subscriber 2 and service control point 6 (called SCP), all comprising part of a signaling network such as AT&T's SS7 network. AT&T's SS7 is an out-of-band signaling network to convey source and destination identification signals. Each SCP 6 typically comprises databases and service application programs that affect the logic of each service that is provisioned. In the SS7 network, the digits are received from the subscriber at the SSP, packaged in a message and sent to a supporting SCP. The SCP interprets the digits and sends switch control signals to the SSP to affect the requested service. The network also includes intelligent peripheral 8 (IPe 8) that stores pre-recorded announcements for play back, and includes service provisioning platform 9 that helps provision new services in SCPs of the network.

In known national telephone networks there may be many SCPs, for example 60 or 70 SCPs, and typically over 200 intelligent peripherals 8 to support various announcement services that are offered to subscribers, each intelligent peripheral containing a database of provisioned announcements. In a national telephone network, there may be millions of subscribers that are connected to thousands of SSPs. A single SCP will support many switches. For example, a single SCP may support 50 to 100 switches. Each switch may connect many subscribers to the network, For example up to 10,000 subscribers may be connected to a switch to gain access to the network.

A network operator may offer to its subscribers voice announcement services or other services that use voice announcements when the network's SCPs are provisioned with the needed service application program. A service application program defines a service and resides in SCP 6. Services that employ voice announcements are supported by one or more intelligent peripherals 8 capable of playing the pre-recorded voice announcements in support of an associated service.

The service application programs for services needing announcements are provided with the announcement ID numbers that refer to the required announcements in an intelligent peripheral at the time of installation. Before the time of installation, the ID numbers of announcements must be coordinated with the ID numbers known to the service application programs that use the announcements. The actual announcements (i.e., the voice files) are stored in intelligent peripheral 8. Announcements for known voice services are pre-installed on one or more of the intelligent peripherals in the network, and the service application programs are pre-installed at one or more of the SCPs. Service provisioning platform 9 is connected to one or more SCPs to deliver provisioning information, tables or the service application program itself to the SCP.

To use the service, a subscriber must be connected to an SSP that is supported by an SCP that has the necessary service application program. When a subscriber uses the service, particular digits provided by the subscriber to the SSP are packaged in a message and sent from the SSP to the SCP. Recognizing the digits, the SCP triggers the service application program which accesses a particular announcement in a particular intelligent peripheral. The service application program that requires an announcement will direct the SSP to connect the subscriber to the intelligent peripheral in order for the intelligent peripheral to play the pre-recorded voice announcements for a subscriber.

Services that play pre-recorded voice announcements are known, but services that permit a subscriber to record an announcement (called "recording on the fly") that may be accessed throughout the network are not known. Known networks lack a procedure for making the announcement available in intelligent peripherals throughout the network while modifying a service application program that has been pre-installed at an SCP so as to be able to address and utilize the newly recorded subscriber announcement.

SUMMARY OF THE INVENTION

It is an object of the present invention to facilitate a subscriber's ability to "record on the fly" announcements while maintaining the integrity of the network announcement database. It is a further object of the present invention to provide a process to coordinate and synchronize the ID numbers assigned to announcements throughout the network.

These and other objects are achieved in a method of provisioning a service in a communications network where the network includes plural intelligent peripherals, a single announcement management system, a service provisioning platform and plural service control points controlled by corresponding application programs. The method of provisioning includes recording an announcement at an intelligent peripheral, receiving an ID number associated with the announcement from the announcement management system at the intelligent peripheral, sending the ID number from the intelligent peripheral through a switch to a service control point, distributing the ID number from the service control point to all other service control points, and distributing the announcement and the ID number from the intelligent peripheral to all other intelligent peripherals.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
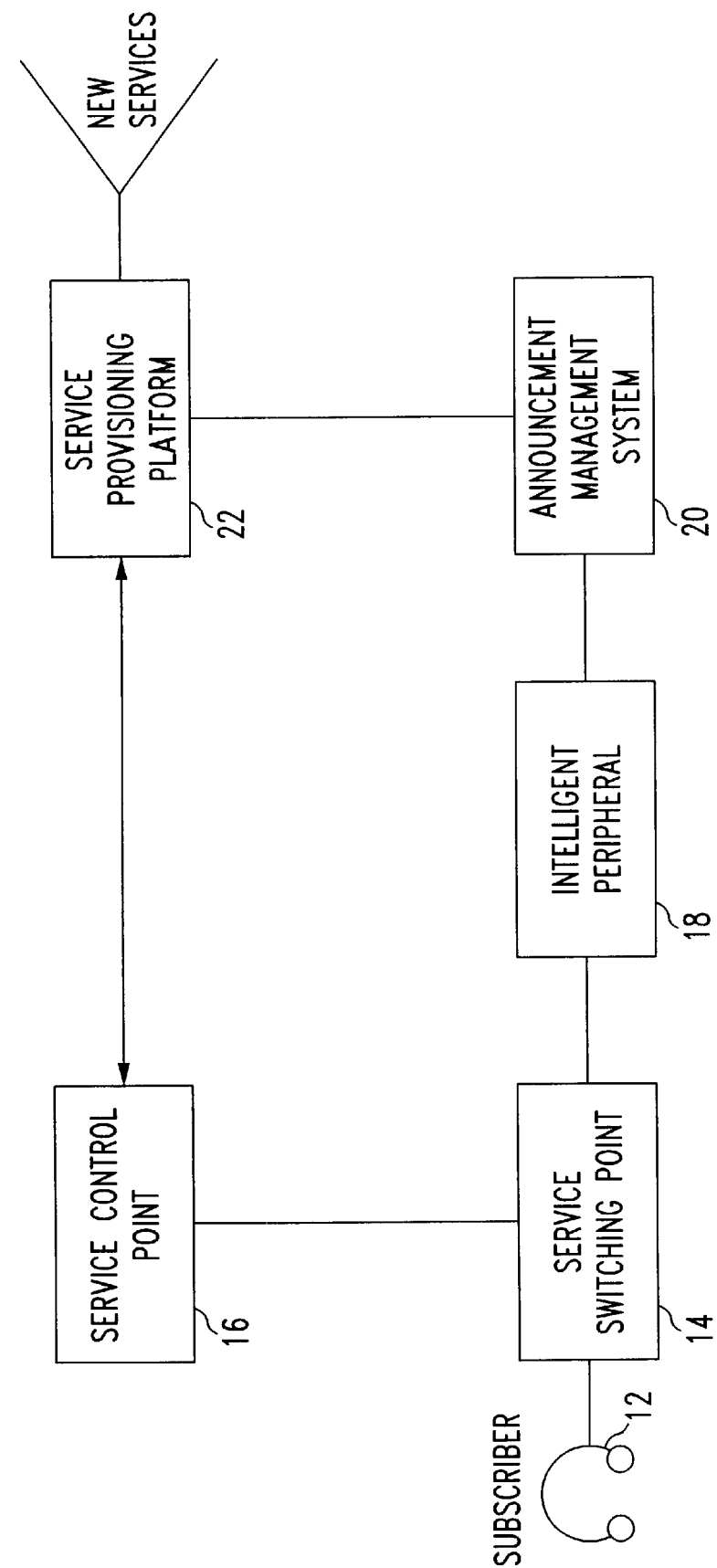
FIG. 1 is a block diagram of the communications network according to the present invention.

In FIG. 1, a communications network is shown, for example, a telephone network. Network 10 includes SSP 14 (service switching point 14), often referred to as simply a "switch", connected to subscriber 12, SCP 16 (service control point 16), and intelligent peripheral 18 (IPe). IPe 18 plays and records voice announcements. Typically, the switch is connected to the SCP using SS7 lines and a TCAP protocol. SS7 is AT&T's known out-of-band signaling network to send and receive communication source and destination signals. Preferably the intelligent peripheral is a separate network element connected to the switch by, for example, a national ISDN (Integrated Services Digital Network). Often, the intelligent peripherals are co-located with major switches in urban centers.

Unlike known networks, the present invention includes announcement management system 20 as a singular system element in the network to assign unique announcement ID numbers and to archive and distribute announcements. An announcement is a voice file, preferably a digitized voice file. These announcements support various service offerings that are made available to the network subscribers. For example, an announcement may say "please enter your personal identification number" or the like. An announcement is identified by a unique ID (identification) number that is used exclusively for the particular announcement throughout the network. A complete set of announcements is stored in each of the intelligent peripherals with the associated announcement ID numbers. The same announcement on two different intelligent peripherals will have the same announcement ID number.

Also, unlike known networks, the service provisioning platform is capable of receiving context table information or simply announcement ID numbers from an SCP and then distributing this information to all other SCPs. This capability is used to complete the provisioning of subscriber recorded announcements as described in more detail below.

The present invention permits an announcement for a service to be recorded by a subscriber anywhere in the network and used throughout the network. A procedure is established to modify a context table in a service application program that has been pre-installed at an SCP so that a new subscriber recorded announcement can be used, and a procedure is established to make the announcement available in intelligent peripherals throughout the network. The context table maps announcements used by a service application program into specific announcement ID numbers. Before a subscriber recordable announcement is actually recorded, a default announcement is referenced in the context table. Alternatively, a special code is contained in the context table. The service application program interprets the context table and takes whatever action the service author desires when the recordable announcement has not yet been recorded (e.g., plays the default announcement). After the subscriber records the announcement, the announcement ID number is stored in the associated slot of the context table. The service application program "looks up" the announcement ID number for announcements it needs by referencing the corresponding slot in the context table.

Network operation may be regarded as being organized in three phases. First, the initial service application program is provisioned at each SCP in the network, and at the same time any pre-recorded announcements are installed at each intelligent peripheral in the network. Second, a subscriber records the subscriber recordable announcement, and the network distributes the announcement to each intelligent peripheral in the network while loading the associated announcement ID number in the context table in the service application program installed at each SCP in the network. Third, when the service is triggered, the service causes the subscriber recorded announcement to be played.

In the first phase, initially provisioning the service application program at each SCP in the network, new services are installed with the help of service provisioning platform 22 (FIG. 1). The service provisioning platform requests a next available announcement ID number from the announcement management system for each prerecorded announcement to be used by the service. Then, the service provisioning platform sends each pre-recorded announcement with its associated announcement ID number to the announcement management system for storage in the archive file. Thereafter, the announcement management system distributes each of the new announcements with the corresponding announcement ID number to each intelligent peripheral where they are stored for ready recall. At the same time, the service provisioning platform distributes the service, typically in the form of a service application program with tables, to each of the SCPs. Typically, the SCPs execute the service application programs in order to affect the service offerings. The actual application program and associated announcements may be originated "off line" in a development facility and delivered to the service provisioning platform in the form of a CD ROM, magnetic tape, or any other convenient information media. For example, the marketing department of the network operator may identify a subscriber need and cause the service to be developed and delivered to the network through the service provisioning platform.

In the present invention, some or all of the announcements to be used by the service are to be subscriber recorded. Thus, the provisioning platform is unable to completely provision these subscriber announcements since they are not pre-recorded. At most, the provisioning platform provisions the SCPs with a context table with a default announcement. The present invention permits the subscriber to "record-on-the-fly" announcements that are to be accessible by the entire network while maintaining the integrity of the announcement database.

In the second phase, after initially installing the service application program in each SCP, but before actually playing the subscriber recorded announcements, the announcement system facilitates the subscriber recording the announcement, the updating of the context tables of the service application programs in all SCPs, and the storing of the subscriber recorded announcement in all intelligent peripherals. To achieve this coordination across the network, the network includes a single announcement management system 20 (AMS) whose function it is to issue a unique announcement ID numbers to be used across the network, to keep an archive file of the announcements used in the system, and distribute announcements (i.e., the voice file) with associated ID numbers from the archive file to the intelligent peripherals of the network.

Figure 2:
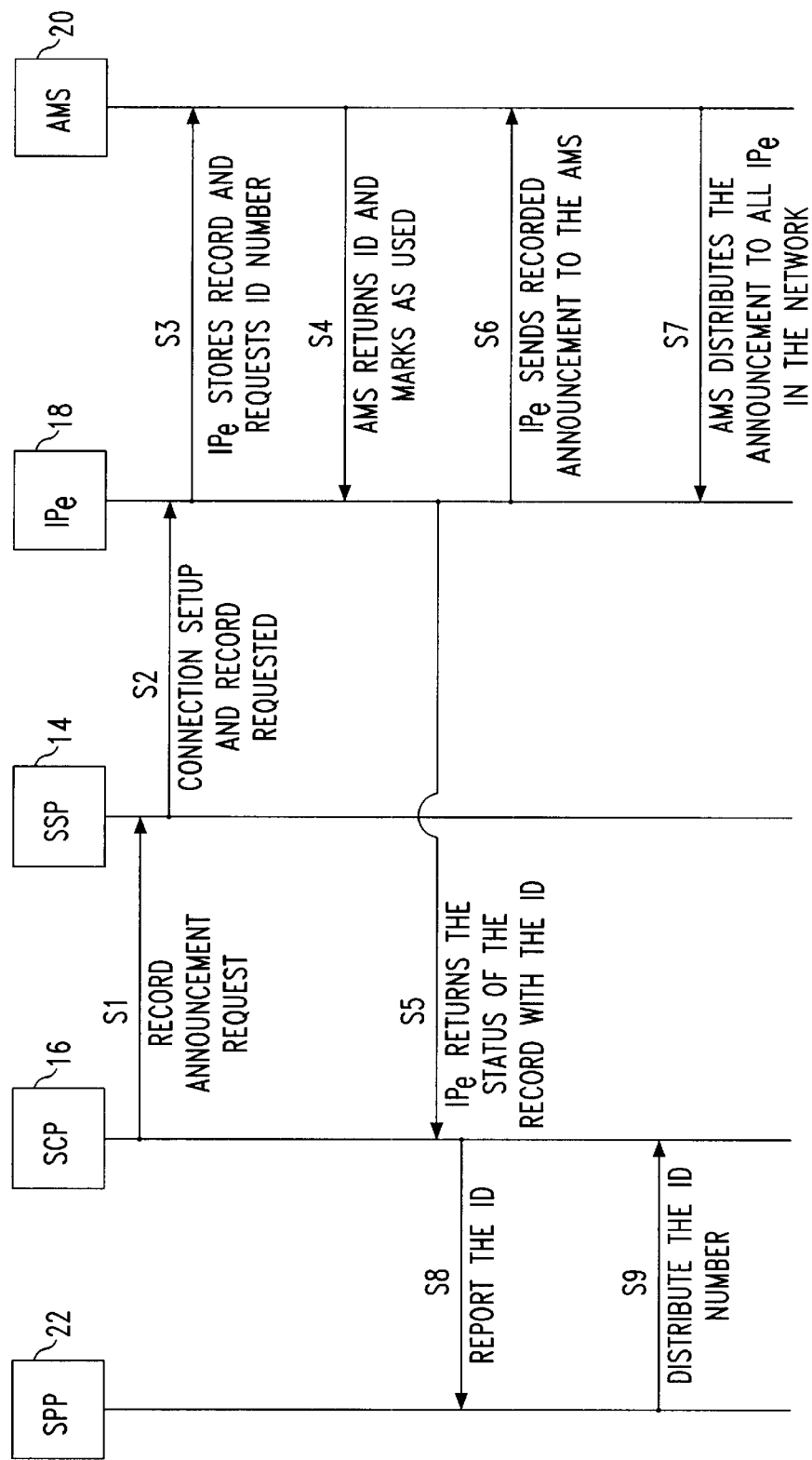
FIG. 2 is a flow diagram showing the manner in which an exchange of information signals between elements of the network provides "record-on-the-fly" operation.
Figure 3:
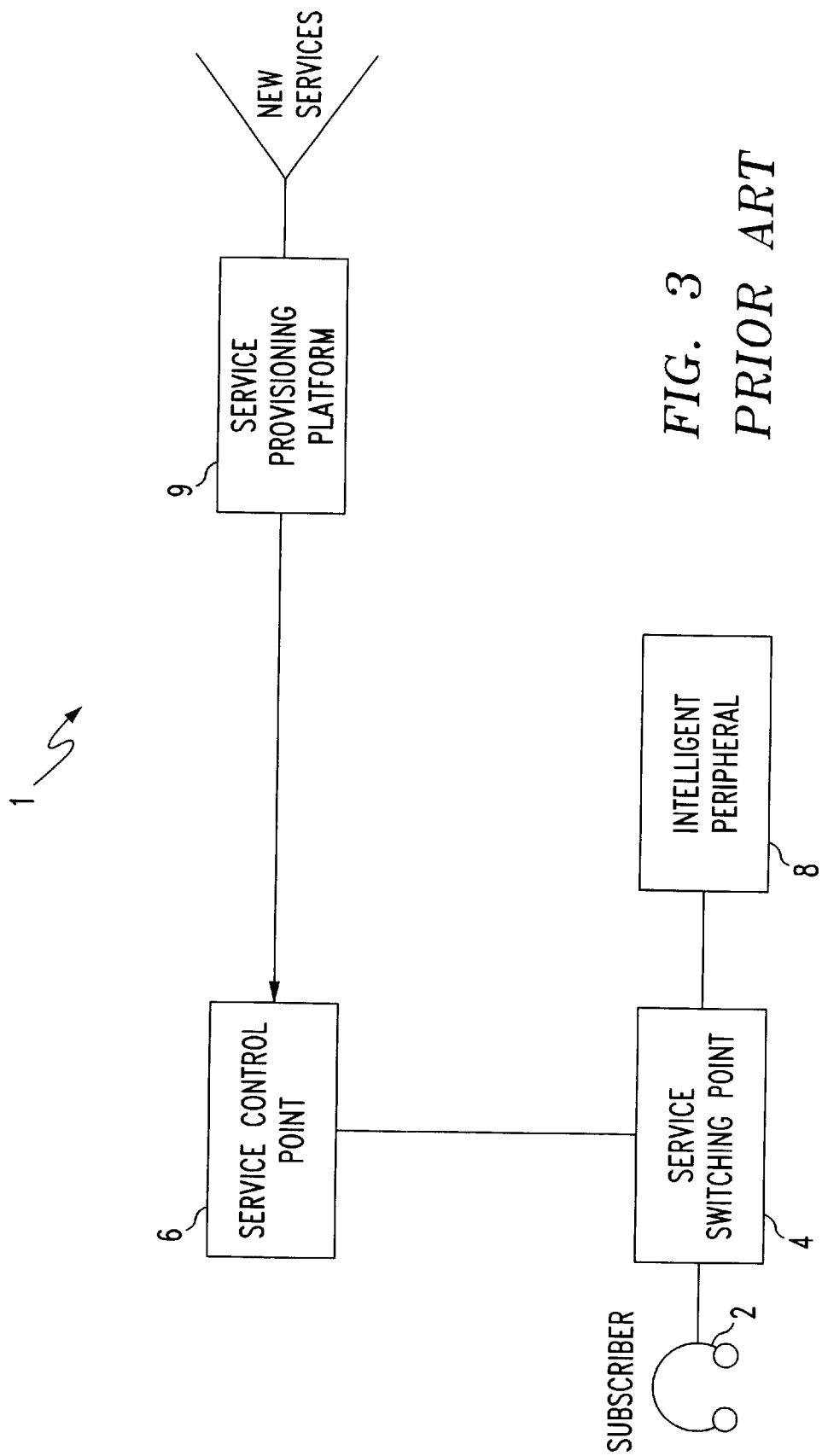
FIG. 3 is a block diagram of a prior art communications network.

FIG. 2 is a flow diagram showing the steps that a subscriber uses to record an announcement, distribute the announcement to all intelligent peripherals 18 and to distribute the announcement ID number to all SCPs.

A subscriber initiates a communication or telephone call by sending in-band signaling information to the SSP. For example, the signaling information may be as simple as the digits of a telephone number that are to be routed over a long distance carrier or as complex as special digits calling for the "record-on-the-fly" service. The SSP collects the signaling information, formats the digits as a message and sends the message to its associated SCP that interprets the signaling information.

In FIG. 2, SCP 16 recognizes the digits as the trigger code for the "record-on-the-fly" service, and invokes the service application program. In step S1, the service application program sends a message to the SSP that includes a destination number of a desired intelligent peripheral and processing instructions requesting that an announcement be recorded. In response to the message, the SSP in step S2 establishes a connection to the intelligent peripheral, forwards the processing instructions from the SCP to the intelligent peripheral to record an announcement, and sets up a connection between the subscriber and the intelligent peripheral to record an announcement. In the present invention, the intelligent peripheral includes a module that recognizes that it is to perform a record announcement operation and that the recorded announcement is to be distributed throughout the network.

In FIG. 2, intelligent peripheral 18 plays the appropriate prompts to the subscriber (e.g., pre-recorded announcements such as "record at the sound of the beep") and starts recording the announcement. After the announcement is recorded, in step S3 (FIG. 2) the intelligent peripheral sends a request to announcement management system 20 (AMS 20) for assignment of a next available unique announcement ID number. The announcement management system accesses its table of valid announcement ID numbers and selects the next available number, and marks the selected ID number as being used so it will not be reassigned. The single AMS 20 in the network ensures that ID numbers are not duplicated and reused when plural possible service provisioning platforms and plural subscribers also requests an ID number. Then, in step S4, the announcement management system provides the intelligent peripheral with the selected ID number.

In step S6 of FIG. 2, the intelligent peripheral sends the announcement (i.e., the voice file) and the associated ID number to the announcement management system for storage in the archive file. From there, in step S7, the announcement management system distributes the announcement (i.e., the voice file) with the associated ID number to each intelligent peripheral in the network for storage and ready recall.

In step S5 of FIG. 2, the intelligent peripheral sends a termination message to the SCP through the SSP with the status of the record announcement operation and the newly assigned announcement ID number. In this way, the service application program learns of the ID number that was assigned to the just recorded announcement, and the module can update its context table associating the announcement ID number with an announcement need of the service application program.

In step S8 of FIG. 8, the service application program at the SCP sends a message to service provisioning platform 22 to provide the new announcement ID number(s) and the context (e.g., the location in a table within the associated service application program) in which the announcement(s) are used. Known service provisioning platforms do not include a communications path to send ID numbers from the SCP to the provisioning platform. The service provisioning platform then distributes the announcement ID number in the context in which the announcement(s) are used to each of the SCPs in the network. At this point the service is ready for use.

Any subscriber in the network may place a call by sending signaling information with the required trigger (e.g., a series of digits) to a local switch which routes the message to an SCP. At the SCP, any SCP in the network, the trigger is recognized and the application program is begun. The application program calls for voice services from a convenient intelligent peripheral using the context table that maps the ID numbers of the recorded announcement into the needs of the application program.

It will be appreciated that the communication links between the various services need not be of any particular technology. Communications between the service provisioning platform and the SCPs and the announcement management system are generally of a wide area network (WAN) type that preferably sends data in a widely accepted Internet protocol (IP). Similarly, communications between the announcement management system and the intelligent peripherals may be of a similar WAN. The ISDN link between intelligent peripherals and switches is presently preferred since present networks employ ISDN; however, other links may be applied. Further, the links between SSPs and SCPs may be of other technologies than those technologies in present networks. In fact, the invention may be implemented in a packet switched network that does not rely on specific circuit connections that are maintained throughout a present circuit based communication.

In a preferred embodiment, the SCP, SSP, service provisioning platform, AMS and IPe are processor controlled in one form or another, where each respective processor is controlled by one or more software modules. The modules may be initially stored on a computer readable memory such as CD-ROM or a floppy disk, and then transferred to and stored in a computer readable memory such as a magnetic disk memory or a semiconductor RAM or first stored in the disk memory and then loaded in the RAM. The modules control respective processors in the SCP, SSP, service provisioning platform, AMS, and IPe elements.

Having described preferred embodiments of a novel announcement system (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by letters patent is set forth in the appended claims.

What is claimed is:

1. A network comprising plural intelligent peripherals (IPes), a single announcement management system (AMS) and plural service control points (SCPs) each controlled by corresponding service application programs, wherein:

a first IPe includes and is controlled by a first module to record a first announcement;

the AMS includes and is controlled by a second module to send a first ID number to the first IPe in response to a request received from the first IPe; and the first IPe further includes and is controlled by a third module to send the first ID number with the first announcement to the AMS and to send the first ID number to a first application program, wherein the AMS further includes and is controlled by a fourth module to distribute the first announcement and the first ID number from the AMS to all other IPes.

2. A network comprising plural intelligent peripherals (IPes), a single announcement management system (AMS) and plural service control points (SCPs) each controlled by corresponding service application programs, wherein:

a first IPe includes and is controlled by a first module to record a first announcement;

the AMS includes and is controlled by a second module to send a first ID number to the first IPe in response to a request received from the first IPe;

the first IPe further includes and is controlled by a third module to send the first ID number with the first announcement to the AMS and to send the first ID number to a first application program, further comprising a service provisioning platform, wherein:

the first application program includes a fourth module to send the first ID number to the service provisioning platform; and the service provisioning platform includes and is controlled by a fifth module to distribute the first ID number from the service provisioning platform to all other application programs.

3. The network of claim 2, wherein the AMS further includes and is controlled by a sixth module to distribute the first announcement and the first ID number from the AMS to all other IPes.

4. A network comprising plural intelligent peripherals (IPes), a single announcement management system (AMS) and plural service control points (SCPs) each controlled by corresponding service application programs, wherein:

a first IPe includes and is controlled by a first module to record a first announcement;

the AMS includes and is controlled by a second module to send a first ID number to the first IPe in response to a request received from the first IPe; and the first IPe further includes and is controlled by a third module to send the first ID number with the first announcement to the AMS and to send the first ID number to a first application program, wherein:

a second IPe includes and is controlled by a fourth module to record a second announcement;

the AMS includes and is controlled by a fifth module to send a second ID number to the second IPe in response to a request received from the second IPe; and the second IPe further includes and is controlled by a sixth module to send the second ID number with the second announcement to the AMS and to send the second ID number to a second application program.

5. In a network having plural service control points (SCPs) and plural intelligent peripherals (IPes), a method of provisioning a service comprising steps of:

recording a first announcement at a first IPe;

receiving a first ID number associated with the first announcement from an announcement management system (AMS) at the first IPe;

sending the first ID number from the first IPe through a switch to a first SCP;

sending the first announcement and the first ID number from the first IPe to the AMS; and distributing the first announcement and the first ID number from the AMS to all other IPes.

6. In a network having plural service control points (SCPs) and plural intelligent peripherals (IPes), a method of provisioning a service comprising steps of:

recording a first announcement at a first IPe;

receiving a first ID number associated with the first announcement from an announcement management system (AMS) at the first IPe;

sending the first ID number from the first IPe through a switch to a first SCP;

sending the first announcement and the first ID number from the first IPe to the AMS;

sending the first ID number from the first SCP to a service provisioning platform; and distributing the first ID number from the service provisioning platform to all other SCPs.

7. In a network having plural service control points (SCPs) and plural intelligent peripherals (IPes), a method of provisioning a service comprising steps of:

recording a first announcement at a first IPe;

receiving a first ID number associated with the first announcement from an announcement management system (AMS) at the first IPe;

sending the first ID number from the first IPe through a switch to a first SCP;

sending the first announcement and the first ID number from the first IPe to the AMS;

sending the first ID number from the first SCP to a service provisioning platform; and distributing the first ID number from the service provisioning platform to all other SCPs.

8. In a network having plural service control points (SCPs) and plural intelligent peripherals (IPes), a method of provisioning a service comprising steps of:

recording a first announcement at a first IPe;

receiving a first ID number associated with the first announcement from an announcement management system (AMS) at the first IPe;

sending the first ID number from the first IPe through a switch to a first SCP;

sending the first announcement and the first ID number from the first IPe to the AMS;

recording a second announcement at a second IPe;

receiving a second ID number associated with the second announcement from the AMS at the second IPe;

sending the second ID number from the second IPe through a switch to a second SCP; and sending the second announcement and the second ID number from the AMS to all other IPes.

* * * * *